(12) United States Patent
Kollegian

(10) Patent No.: US 6,758,346 B2
(45) Date of Patent: Jul. 6, 2004

(54) APPARATUS FOR STORING DISKS

(75) Inventor: Les Kollegian, La Jolla, CA (US)

(73) Assignee: Disc Dealer, Inc., San Diego, CA (US)

( * ) Notice: Subject to any disclaimer, the term of this patent is extended or adjusted under 35 U.S.C. 154(b) by 0 days.

(21) Appl. No.: 10/108,065

(22) Filed: Mar. 27, 2002

(65) Prior Publication Data

US 2002/0139762 A1 Oct. 3, 2002

Related U.S. Application Data

(60) Provisional application No. 60/278,964, filed on Mar. 27, 2001.

(51) Int. Cl.[7] ................................................ A47F 7/00
(52) U.S. Cl. ........................ 211/40; 211/41.1; 312/9.9; 206/308.1
(58) Field of Search .................... 211/40, 41.1; 312/9.9; 206/308.1, 454, 453

(56) References Cited

U.S. PATENT DOCUMENTS

| | | | |
|---|---|---|---|
| 3,146,041 A | * | 8/1964 | Lambert |
| 4,664,454 A | | 5/1987 | Schatteman et al. |
| 5,170,893 A | * | 12/1992 | Smith .......................... 211/40 |
| 5,447,243 A | * | 9/1995 | Graber |
| 5,632,374 A | * | 5/1997 | Fitzsimmons et al. .... 211/40 X |
| 5,713,462 A | * | 2/1998 | Hansen ..................... 206/308.1 |
| 6,048,042 A | | 4/2000 | Chan |
| 6,089,384 A | | 7/2000 | Watson et al. |
| 6,193,061 B1 | | 2/2001 | Lew et al. |
| D445,287 S | * | 7/2001 | Kujala |
| D462,863 S | * | 9/2002 | Kollegian |
| D470,001 S | * | 2/2003 | Munroe |

OTHER PUBLICATIONS

Herrington Catalog, 100 CD Selector, Web Site, Obtain from Web on Aug. 10, 2000, http://www.herringtoncatalog.com/a278.html, Londonderry, NH.
Levenger Catalog, CD Jukebox J–CS1045, Levenger Catalog, Jun. 2000, p. 18, Summer 2000, Delray Beach, FL.
Levenger Catalog, CD Jukesleeve, Web Site, Obtain from Web on Jul. 5, 2002, http://www.levenger.com, Delray Beach, FL.

* cited by examiner

Primary Examiner—Robert W. Gibson, Jr.
(74) Attorney, Agent, or Firm—Dalina Law Group P.C.; Joseph J. Mayo

(57) ABSTRACT

A storage housing or unit for holding a circular disk, such as a CD-ROM, Audio Compact Disk, DVD, or any media product of a similar size, shape, or thickness. The unit has a top portion with a number of grooves recessed approximately half the depth of the unit to house the disks at a slight angle for easy access and viewing. The center of the container may include a piece of closed cell foam or other soft material that has slits approximately 1.5 times the thickness of the disk that will frictionally engage the disk without causing any harm or scratches to the disk. However, other embodiments of the invention do not utilize such material. The unit sits upright with or without a stand and allows multiple disks to be stored and viewed without the use of any other storage apparatus such as sleeves or jewel cases. The unit is decorative in fashion and can be made using many different materials in a myriad of colors. An area in front or on top of the unit is saved for the placement of a logo or corporate identity.

17 Claims, 14 Drawing Sheets

APPARATUS FOR STORING DISKS

This application claims the benefit of Provisional Application Serial No. 60/278964, filed on Mar. 27, 2001 entitled Apparatus for Storing Disks.

FIELD OF THE INVENTION

This invention relates to the field of computer disk storage solutions. More specifically, the invention relates to a method and apparatus for storing computer disks such as CD-ROMs or any other type of computer readable data.

BACKGROUND

In the present discussion about current systems, the problems and limitations set forth as existent in the prior art are provided for exemplarily purposes. It should be clear to one of ordinary skill in the art that these problems also exist in other contexts or professions and that the invention may apply to situations other than the ones described herein.

There are many different ways to store computer disks such as CD-ROMs, Audio CDs, and DVDs. The most prominent storage solution is known in by those of ordinary skill in the art as a "Jewel Box". Although bulky and inconvenient to use, a jewel box is an excellent long-term storage case for CD's because it provides protection from dust, scratches, and breakage. Most storage solutions currently on the market claim to provide equal protection as the jewel box. However, there are many disadvantages with jewel boxes and other types of storage solutions. A jewel box is meant for long term CD storage. Although jewel boxes protect the CD, they do not provide quick and convenient access for placement to and from playback or recording apparatuses such as audio or computer equipment. Furthermore, jewel boxes, sleeves, and other containers that hold CDs only provide storage and protection for one CD.

Because of these disadvantages, consumers tend to leave CD's out of their cases to save time for quick access. This can potentially harm the CD's by increasing odds of scratching the CD or causing other imperfections. Furthermore, consumers that are worried about scratching their CD, yet require quick access, will lay the CD upside down to prevent the "play" side from touching any surface. Since logos and/or other identifying information is not printed on the "play" side, placing the CD upside down makes it impossible for the user to see the area of the CD that identifies the content of the CD.

Thus, there is a need for a CD holding apparatus that enables users to easily access the CD without having to endure the process of removing the CD from a jewel case. However, it is also important that CD storage solutions prevent damage from occurring to the "play" side of the CD. Therefore what is desired is a storage apparatus that provides temporary housing for several compact disks, which adequately protects the disk from scratching and provides quick and convenient access to the compact disk for easy placement and removal, as well as the ability to view the CD of choice.

SUMMARY OF THE INVENTION

An embodiment of the invention comprises an apparatus for holding computer disks without a jewel case in a manner that displays the non-play side of the disk to the user. In one or more instances the apparatus embodying the invention comprises an open-faced housing having a plurality of grooves recessed into one or more portions of the housing. Each groove is configured to hold CDs so that the user may easily insert CDs and/or any other type of media into the grooves. The invention contemplates the inclusion of grooves of varying size and depth into the open-faced housing. The open-faced housing may comprise a uniform piece that is formed via an injection mold or any other type of housing that may contain recessed grooves without inhibiting the function of the housing. A computer monitor, computer case, desk, computer printer, or any other place where it would be convenient for a user to store disks may be adapted to incorporate embodiments of the invention.

In the event that the open-faced housing is configured with multiple grooves, each groove may be separated from the other by a distance greater than the thickness of the disks the apparatus is designed to hold. If, for instance, the apparatus is configured to hold CDs, the second groove is proximally located a distance from the first that is greater than the thickness of the CD. However, the invention is not limited to spacing the grooves at any particular distance and may contain grooves that are separated by more or less than the thickness of the medium the apparatus is intended to hold. In one embodiment of the invention, each groove acts as a repository for holding disks in a specific position. A groove that is recessed into the top portion of the housing may, for example, be configured to hold CD-ROMs, DVDs, CDRs, or any other form of data storage in an upright position. In other instances the grooves are configured to hold disks in alternative positions. If the grooves are recessed into the side portion of the housing, the grooves may hold disks in a sideways or other angled position.

In accordance with an embodiment of the invention, one or more grooves are configured to hold the disks in position by frictionally engaging disks placed into the groove. Each groove may, for example, comprise an insert that holds the disk in place without damaging the surface of the disk. The insert may be made felt, rubber, foam, or any other substance that can be utilized to provide a protective layer between the disk and the housing in which the disk may be placed. The width of each insert depends upon the type of media the apparatus is intended to hold. In one embodiment of the invention, each insert is minimally greater than the thickness of the media the insert will frictionally engage. If, for example, a DVD or CD-ROM is to be held by the insert, the insert comprises an opening large enough to allow the disk to be easily removed, but narrow enough to firmly hold the disk in place. The reader should note however, that not all versions of the invention require an insert and that grooves may be adapted to holds disks by incorporating grooves having an upper and a lower portion into the apparatus. For instance, concave shaped grooves or other angular forms of groove designs are contemplated.

DETAILED DESCRIPTION OF THE INVENTION

A method and apparatus for storing disks or other forms of data storage is described. In the following description numerous specific details are set forth in order to provide a more thorough understanding of the present invention. It will be apparent, however, to one skilled in the art, that the present invention may be practiced without incorporating all aspects of the specific details described herein. In other instances, well-known features have not been described in detail so as not to obscure the invention.

The storage apparatus described herein is designed to house a disk (e.g., a compact disk) of any size or shape in a functional manner. An embodiment of the invention comprises an apparatus for holding disks without a jewel case in a manner that displays the non-play side of the disk to the user. In one or more instances the apparatus embodying the invention comprises an open-faced housing having a plurality of grooves recessed into a portion of the housing. Any conventional or unconventional Compact Disk (CD), CD-ROM, CDR, CDR-W, or DVD containing, for example, any audio or visual information including music, movies, software or any combination thereof can be stored by embodiments of the invention. The term "disk" is utilized to represent circular disk 120 for the sake of convenience only; the term is not meant to be limited solely to compact disks, but may represent any data storage solution. Disk 120 may, for example, represent a CD-ROM, CDR, DVD, CDR-W, or computer readable objects having other shapes. Thus, the storage apparatus may be adapted for use with square, rectangular, or any other angled or non-angularly shaped data storage solution.

Figure 1:
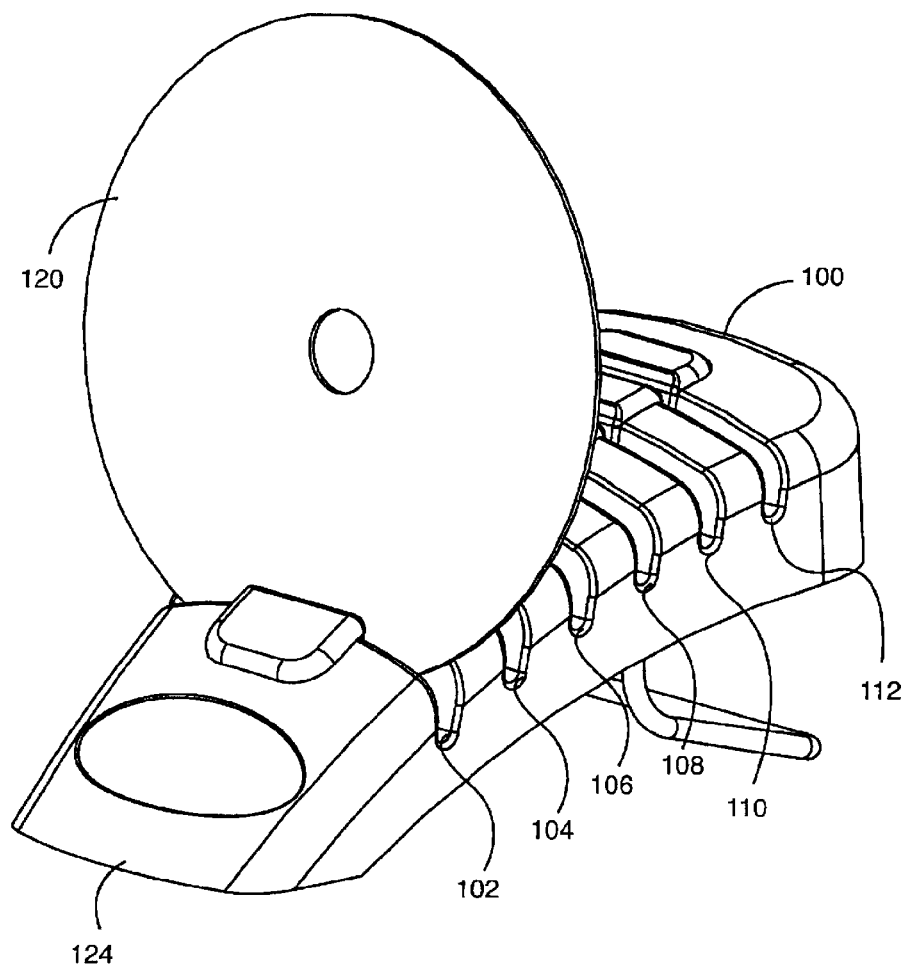
FIG. 1 comprises an example of an angled view of the front and top of the media storage apparatus in accordance with one embodiment of the invention.

FIG. 1 shows an example of an open-faced housing configured in accordance with an embodiment of the invention. The apparatus is designed to provide the user with a place for quickly accessing disks. Thus disks placed in the apparatus are inserted without a jewel case or any other form of packaging material. Grooves 102–112 are recessed into a portion of open-faced housing 100 and each groove is configured to hold disk 120 in an upright position. Each groove is configured to hold disk 120 so that the user may insert disk 120 (e.g., a CD, DVD, and/or any other type of data storage media into the grooves). The invention contemplates the inclusion of grooves 102–112 of varying size and depth into open-faced housing 100. Thus, grooves 102–112 may comprise any type of indentation or depression adapted to hold disk 120 in an upright position.

Open-faced housing 100 may comprise a uniform piece that is formed via an injection mold process. In this instance the open-faced housing is made of plastic or some other type of polymer based compound. However, the invention contemplates the use of any substance that can be molded to form a shape having recessed grooves (e.g., wood, metal, etc . . . ). In one embodiment of the invention the uniform piece that forms the open-faced housing is a single piece molded into a shape that contains recessed grooves although it is important to note that the invention is not limited to instances where one uniform piece forms the open-faced housing. Any number of pieces may be coupled together to form a shape that has a plurality of grooves recessed into a portion of the structure. However, a single piece may also form open-faced housing. For instance, a single piece of plastic could be shaped to form the apparatus embodying aspects of the invention.

In some instances the open-faced housing is integrated into devices having a purpose other than the storage of disks. For example, the open-faced housing may be part of any other type of device or housing adaptable to contain recessed grooves for holding data storage solutions without inhibiting the function of the housing. A computer monitor, computer case, desk, computer printer, or any other item where it would be convenient for a user to store disks may be adapted to become an open-faced housing having recessed grooves configured to hold a disk in an extended position. It should be understood by one of ordinary skill in the art that open-faced housing 100 may take on any size and shape, as well as house any number of CD's to be stored vertically, horizontally, or in any other position. In each instance, open-faced housing may hold any form of digital media without requiring any additional storage solutions. For instance, a jewel case or any other form of CD packaging is not required in order to hold the data storage solutions. In one embodiment of the invention open-faced housing 100 is designed to look "sleek" and "high-tech" by rounding the edges to enhance consumer appeal and encourage impulse buying. However, the invention may take other forms or shapes that incorporate the functionality described herein.

In the event that the open-faced housing is configured with multiple grooves, each groove 102–112 may be separated from the other by a distance greater than the thickness of the disks the apparatus is designed to hold. If, for instance, the apparatus embodying the invention is configured to hold disk 120 and disk 120 represents a CD, the second groove is proximally located a distance from the first that is greater than the thickness of the CD. Thus, the distance between groove 102 and groove 104 is typically greater than the thickness of disk 120. However, the invention is not limited to spacing the grooves at any particular distance and may contain grooves that are separated by more or less than the thickness of the medium the apparatus is intended to hold.

In one embodiment of the invention, each groove 102–112 acts as a receptacle for holding disk 120 in a specific position. A groove that is recessed into the top portion of the housing may, for example, be configured to hold CD-ROMs, DVDs, or CDRs in an upright or extended position (see e.g., groove 102). In other instances grooves 102–112 are configured to hold disks in alternative positions. If the open-faced housing is positioned upright (e.g., where groove 112 is located closet to the portion of the housing that is in contact with a physical surface) grooves 102–112 are considered recessed into the top portion of the housing. However, grooves may be adapted to hold disks in a sideways or other angled position. Open-faced housing 100 may have a portion 122 designed to display identifying information such as a company logo or other graphic image. Identifying information may be attached to the area in the form of a sticker, engraving, or other printing method. It should also be noted that any company could use this area to brand the product by placing their company logo in its place.

It is important to note that although the term open-faced housing is used for illustrative purposes, an embodiment of the invention also contemplates the use of housings that may be covered so as to provide further protection for disks held within the recessed grooves of the housing. Thus, for example, open-faced housing 100 may be configured to also include a cover that protects the surface of the disks placed in grooves 102–112. Open-face housing 100 is typically positioned so that the user can view the front portion (non-play side) of disk 120. The top portion of the open-faced housing may be positioned at an angle that allows the user to see a front portion of each disk. The apparatus may, for instance, sit at an angle that positions each groove on a plane that is approximately 30 degrees different from the surface upon which the apparatus is placed. However, the invention contemplates embodiments using various other positions and may, for example, be adapted so that the plane each groove sits at is any angle. Embodiments of the invention may sit vertically, horizontally, upside down, or at any position in-between.

Figure 2:
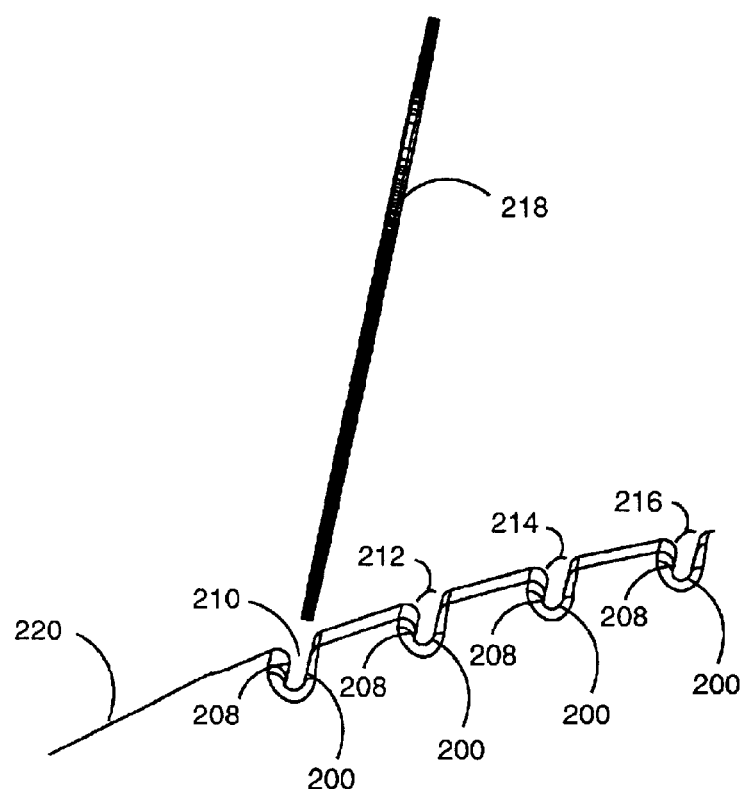
FIG. 2 provides an example of the interior portion of each groove designed to fictionally engage disks in accordance with one embodiment of the invention.

FIG. 2 provides an example of the interior portion of each groove in accordance with one embodiment of the invention. Each groove 210–216 is configured to hold disk 218 in position by frictionally engaging a disk placed into the groove. Groove 208, for example, may comprise an insert 200 that holds the disk in place without damaging the surface of disk 218. Open-faced housing 220 may have any number of grooves and may be adapted to contain more or less than the number of grooves illustrated in FIG. 1. Insert 200 may be made felt, rubber, foam, or any other substance that can be utilized to provide a protective layer between disk 218 and housing 220 in which disk 218 may be placed. In one embodiment of the invention inserts 200 keep disk 218 or other form of digital media secure by keeping the front or back of the item placed within the insert from touching the open-faced housing to avoid scratching the disk surface. Inserts 200 may also be configured to hold disk 218 snuggly in place. The width of each insert 200 depends upon the type of disk 218 the apparatus is intended to hold. In one embodiment of the invention, each insert 200 is minimally greater than the thickness of the disk the insert will frictionally engage. If disk 218 is, for example, a DVD or CD-ROM, insert 200 comprises an opening large enough to allow the disk to be easily removed, but narrow enough to firmly hold the disk in place.

Figure 7:
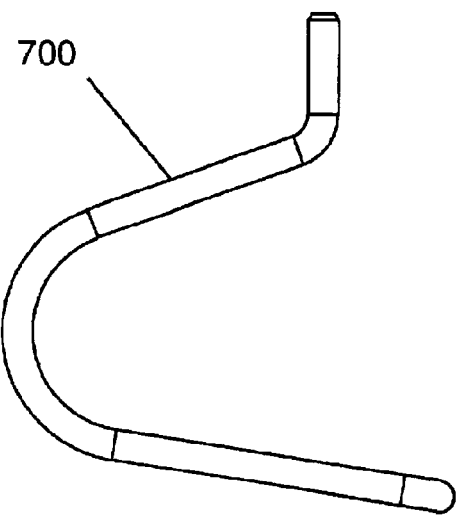
FIG. 7 comprises an enlarged version of a stand (rear and side view) for the open-faced housing in accordance with one embodiment of the invention.
Figure 7:
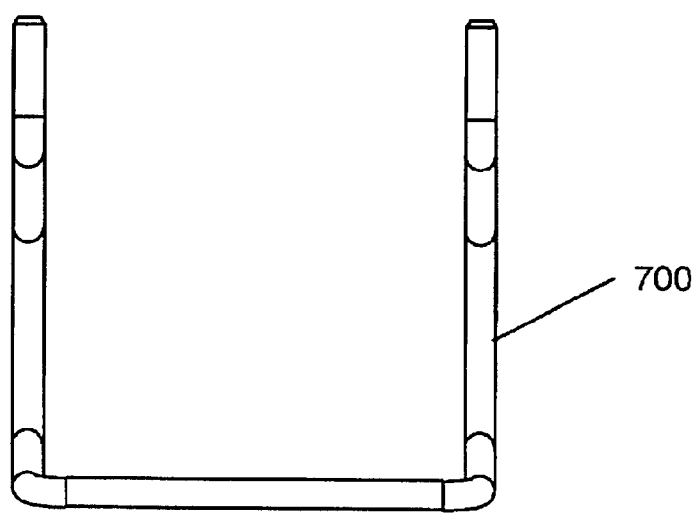

Grooves 210–216 may be recessed at varying depths. For example, groove 206 located toward the back portion of open-faced housing 220 may have a depth less than groove 214. In some instances however, each groove is approximately the same depth but open-faced housing is positioned at an angle so that the top portion of each disk sits above the preceding disk. Referring back to FIG. 1, for example, a disk placed in groove 102 sits at a lower position than a disk placed in groove 112. The invention contemplates the use of any type mechanism designed to position open-faced housing 100 at an incline. For example, stand 122 moves open-faced housing 100 into an inclined position so that the disks are arranged in a plane that slants upwards. Thus, the back portion of open-faced housing 100 is typically higher than front portion 124. The stand may comprise a wire frame or some other type of substance (e.g., plastic, wood, or any other solid substance). When a wire frame is utilized, the wire frame may be inserted into open-faced housing 100 in holes or other coupling mechanisms located underneath housing 220. FIG. 7 illustrates an enlarged version of housing stand 700 and its shape. However, frame stand is optional and the housing may be formed in such a way that is has it own stand integrated into the housing. Stand 700 can be made of any solid material that can support open-faced housing 100 and force it to stand so that the front is flush and touching any flat surface. Thus stand 700 enables front portion 124 to lie flat on the surface when the stand 700 is attached. It is important to note that the purpose of stand 700 is used to help lift the open-faced housing into an inclined position to provide easier viewing and access to disks held within the grooves. However, it is not imperative to have stand 700 attached to effectively use open-faced housing 100. The housing can still be configured to reside at an incline without stand 700.

Figure 3A:
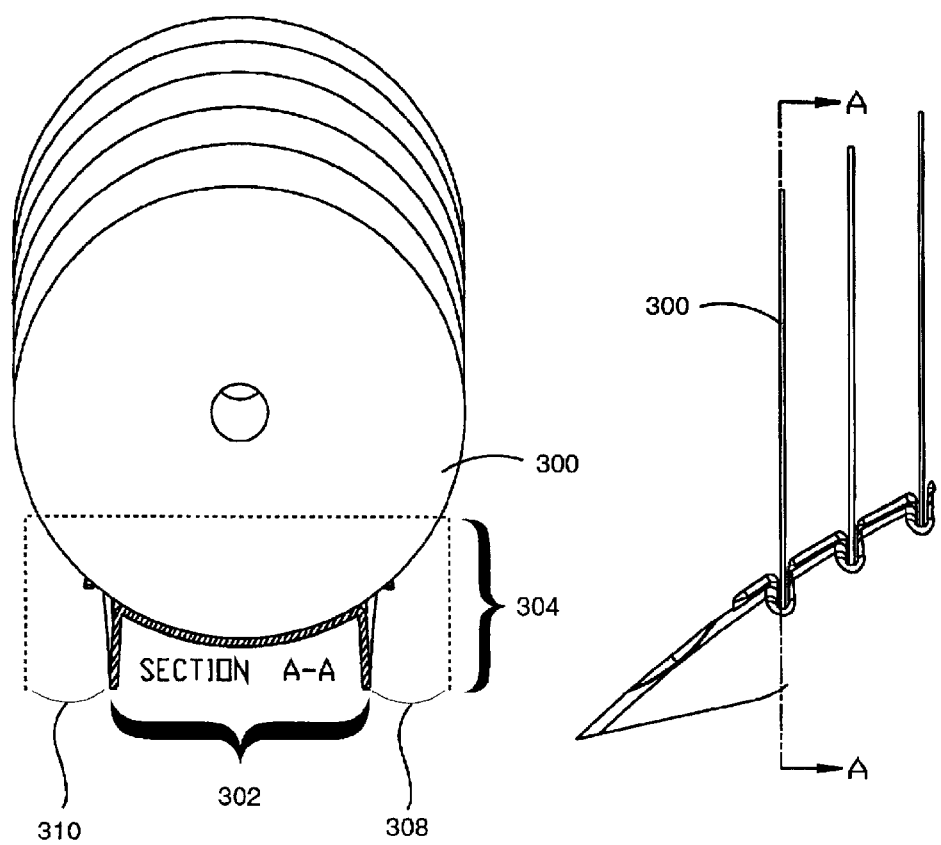
FIGS. 3A and 3B illustrate a cradle groove in accordance with an embodiment of the invention.
Figure 3B:
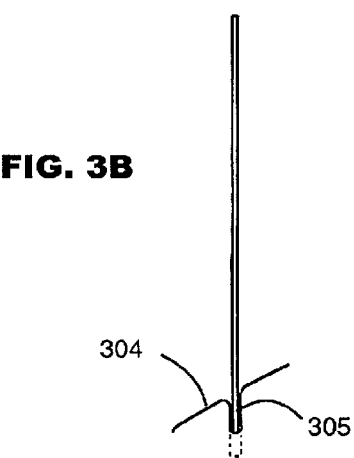

FIG. 3a illustrates an alternative configuration for each groove in accordance with an embodiment of the invention. One or more of the grooves illustrated in FIG. 1, for example, may be configured to hold disk 300 in a cradle portion 302 that provides the disk with a place to rest. Cradle portion 302 need not frictionally engage the disk, but may contain a buffer that prevents the disk from damage. However, in one embodiment of the invention no such buffer is present and disk 300 sits in cradle 302. FIG. 3b shows a side view of cradle 302 as it is integrated into open-faced housing 304. In this instance groove 305 does not contain any protective insert, but is instead configured in to hold a disk without a jewel case. Grooves 305 may, for instance, have a base that utilizes a step or concave shape to hold circular objects and/or other shaped objects of varying size. This concave portion is referred to in one embodiment of the invention as cradle 302. However, cradle 302 need not always to be concave. Rather cradle 302 comprises a center portion (302) lower than the two side portions (310 and 308).

Figure 4:
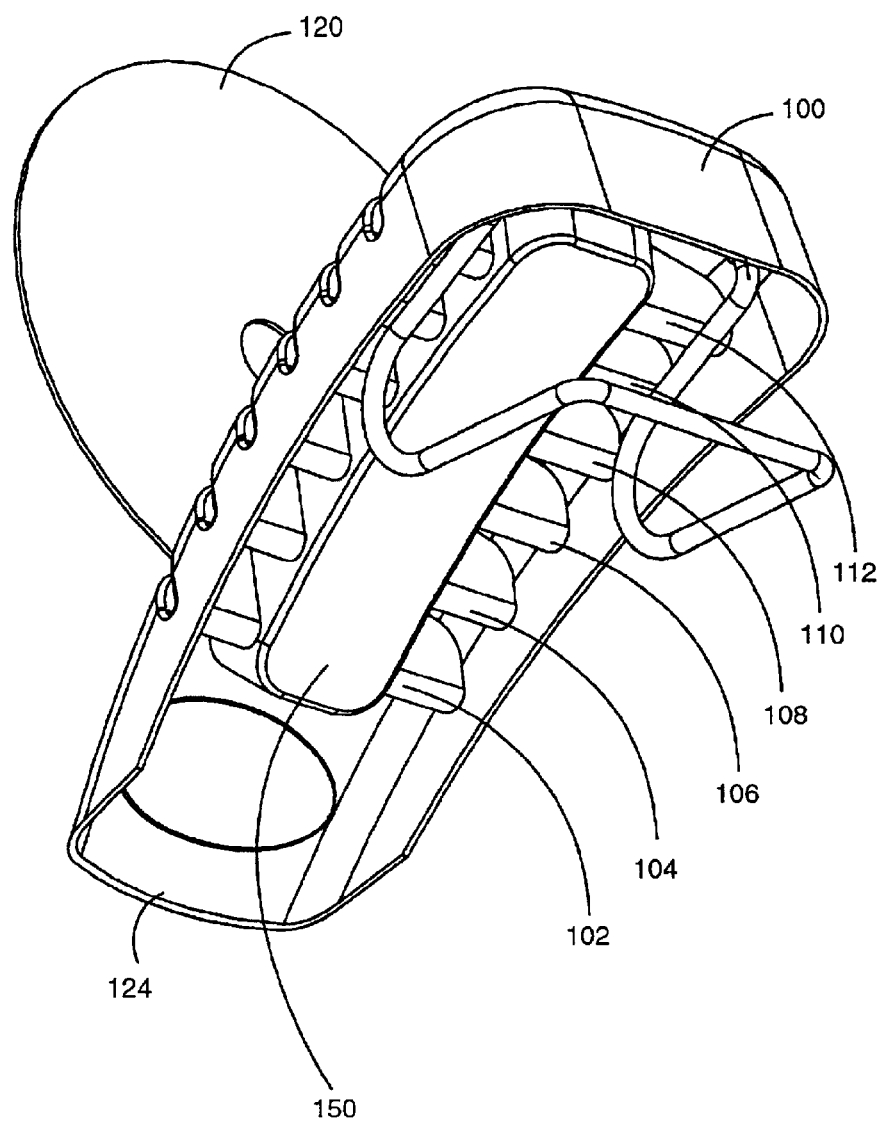
FIG. 4 comprises an example of an angled view of the bottom of the open-faced housing showing recessed central portion in accordance with an embodiment of the invention.

As used in this description, the terms "up", "down", "top", "bottom", etc., refer to housing 100 when in the orientation illustrated in FIG. 1. FIG. 4 shows an embodiment of the invention from a bottom view perspective. Grooves 102–112 are recessed into open-faced housing and disk 120 may be positioned in each groove. Center portion 150 represents cradle 302. However, center portion 150 may also provide a location for placement of inserts 200–206. Center portion 150 is not required in order to properly hold disk 120 in position but may be optionally included so as to provide the manufacture with design flexibility.

Figure 5:
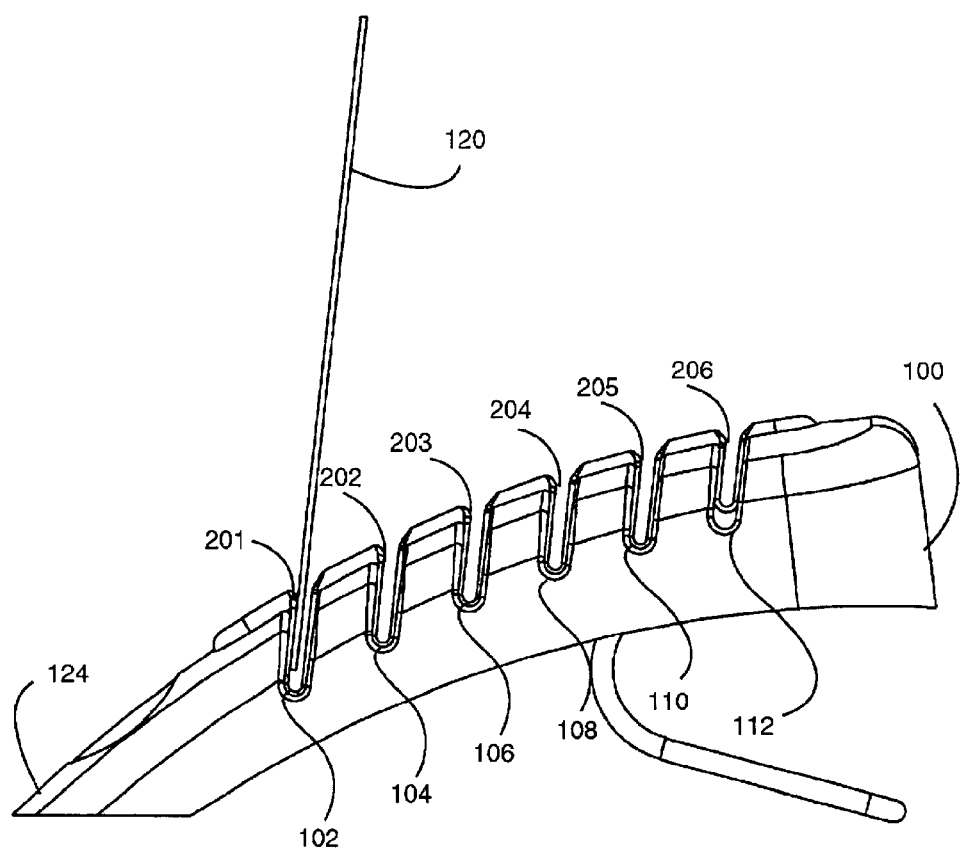
FIG. 5 comprises an example of a side view of the open-faced housing showing recessed grooves for disk storage in accordance with an embodiment of the invention.

FIG. 5 illustrates a side view of the open-faced housing in accordance with an embodiment of the invention. Inserts 200–206 may protrude from grooves 102–112 and can therefore be removed from open-faced housing 100 for purposes of replacement or design flexibility. Inserts 200–206 may have beveled edges in front and back of each groove to increase ease of disk access to and from the groove. However, grooves may also be configured to hold digital media without any insert.

Figure 6:
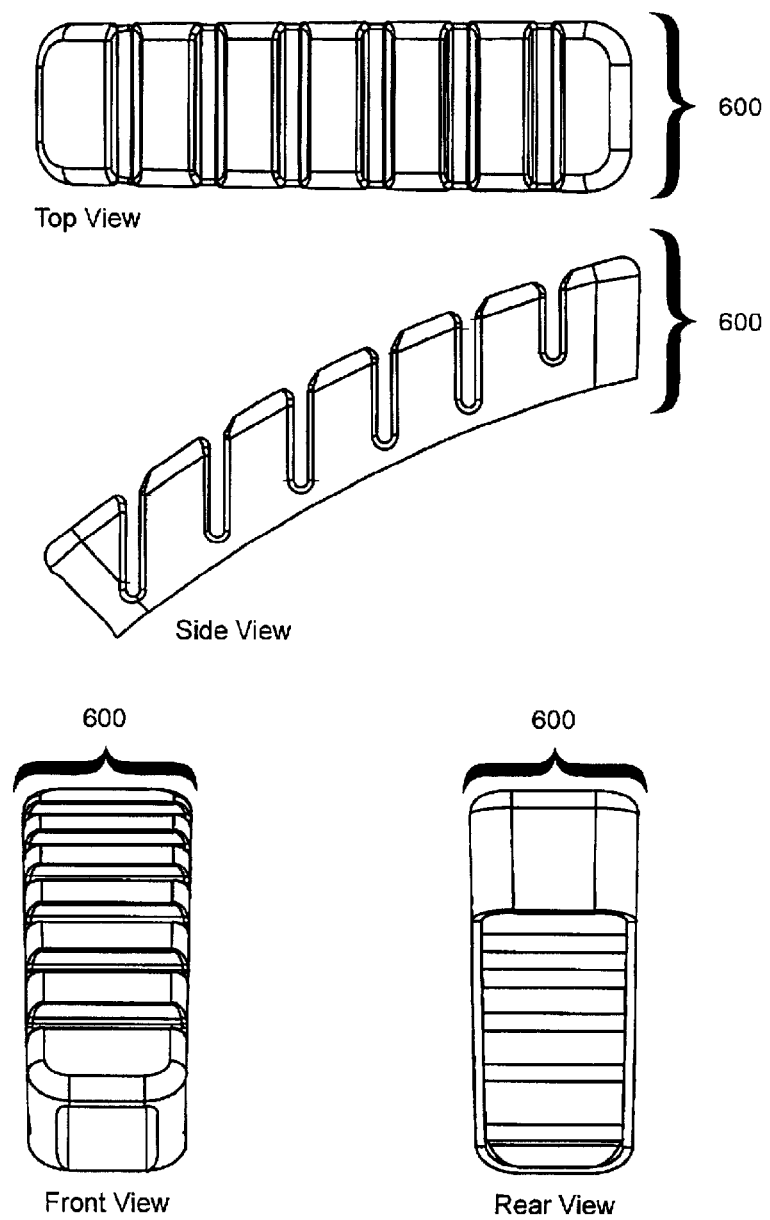
FIG. 6 illustrates a removable set of inserts adapted to be placed within open-faced housing in accordance with one embodiment of the invention.

In one embodiment of the invention inserts 200–206 are not removable and are part of the housing itself. However, in other instances inserts 200–206 are incorporated into a removable portion that snugly sits in open-faced housing 100 within portion 150. An example of a removable set of inserts 600 is shown in FIG. 6. Removable set of inserts 600 may comprise multiple slots adaptably configured to hold the digital media. In one embodiment of the invention, each slot is approximately 1.5 times the width of the digital media the slot is intended to store. However, the invention contemplates the use of slots having any width that snuggly holds a disk. The slots are typically centered in grooves 102–112 but may be located in other positions. The removable set of inserts may be comprised of closed cell foam, rubber, or some other type of substance that will hold a disk in an extended position, but still allow the user to pull the disk from the slot.

Figure 8:
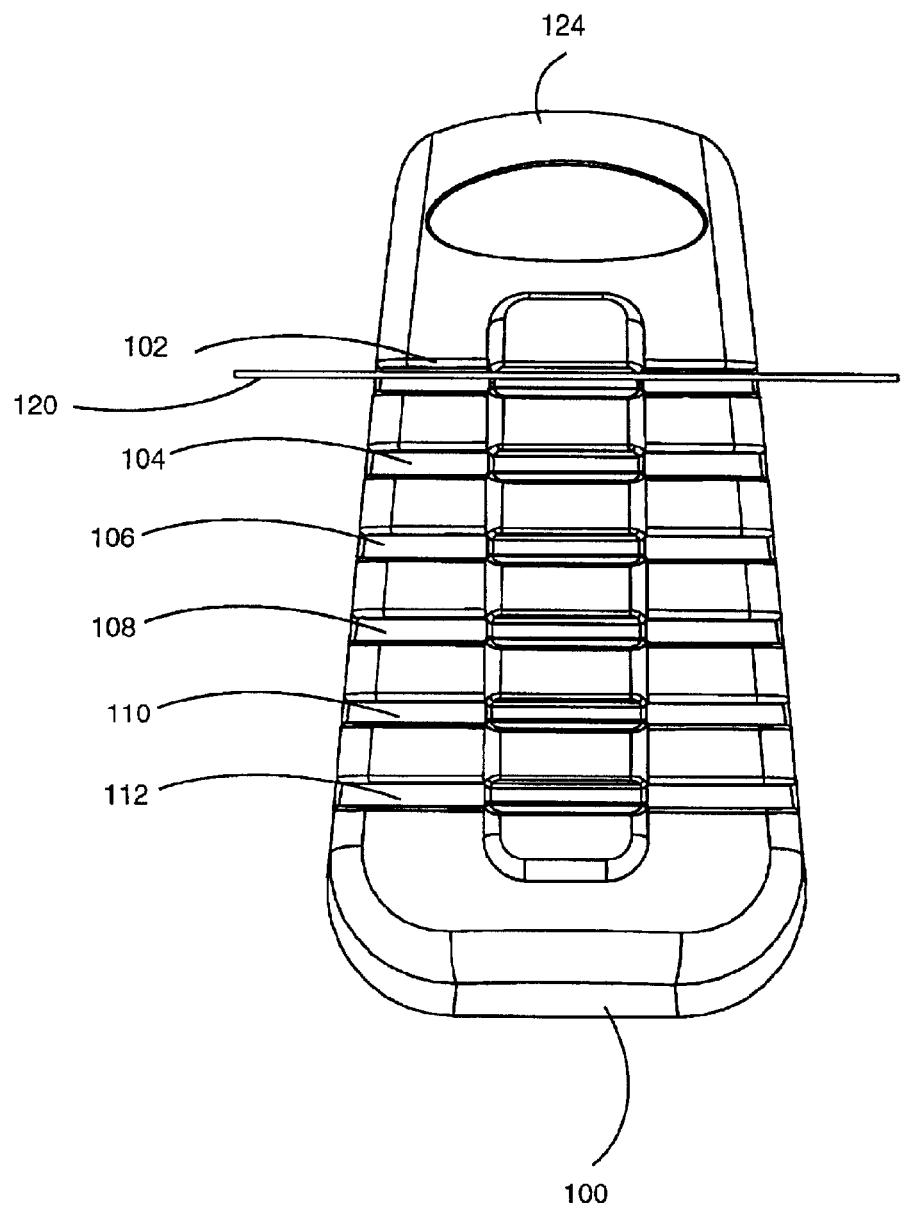
FIG. 8 comprises a top view of the open-faced housing with focus on a front portion and set of removable inserts in accordance with an embodiment of the invention.
Figure 9:
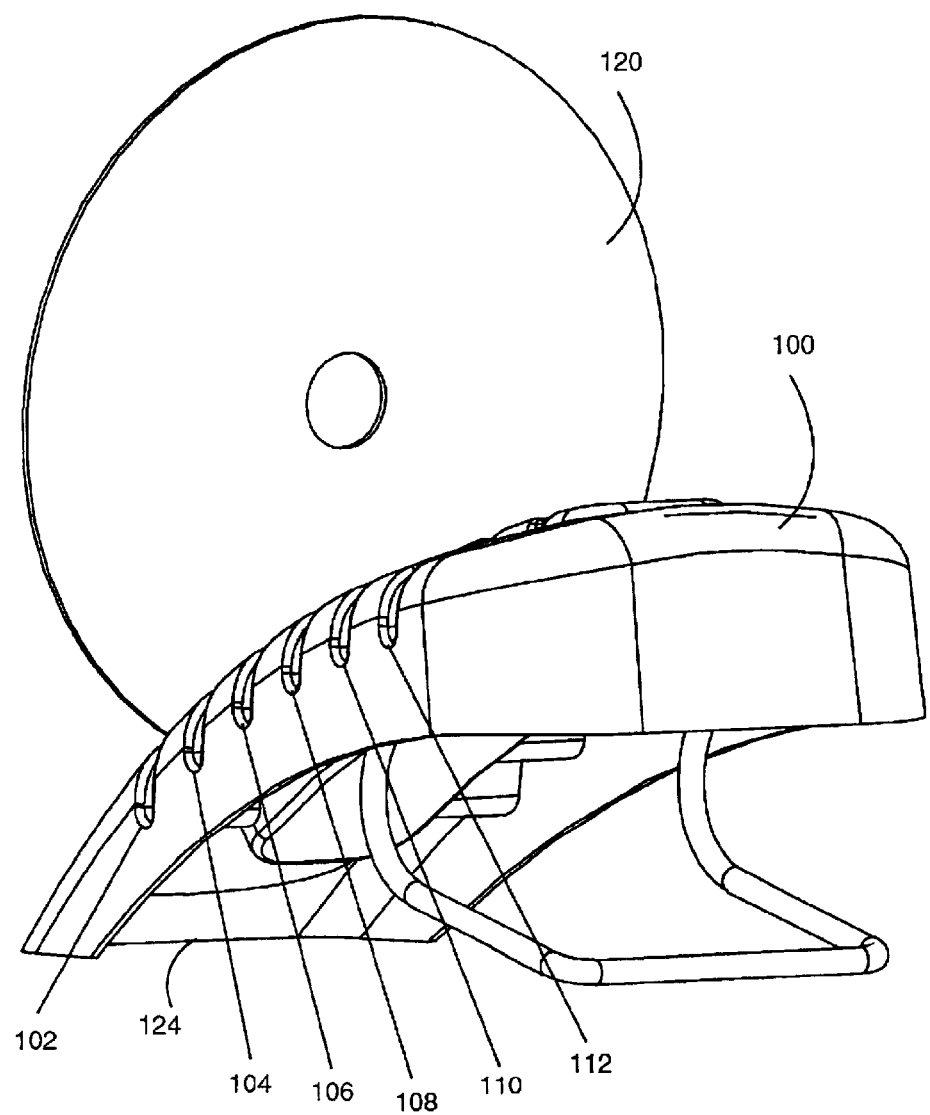
FIG. 9 comprises a rear view of the open-faced housing in accordance with one embodiment of the invention.
Figure 10:
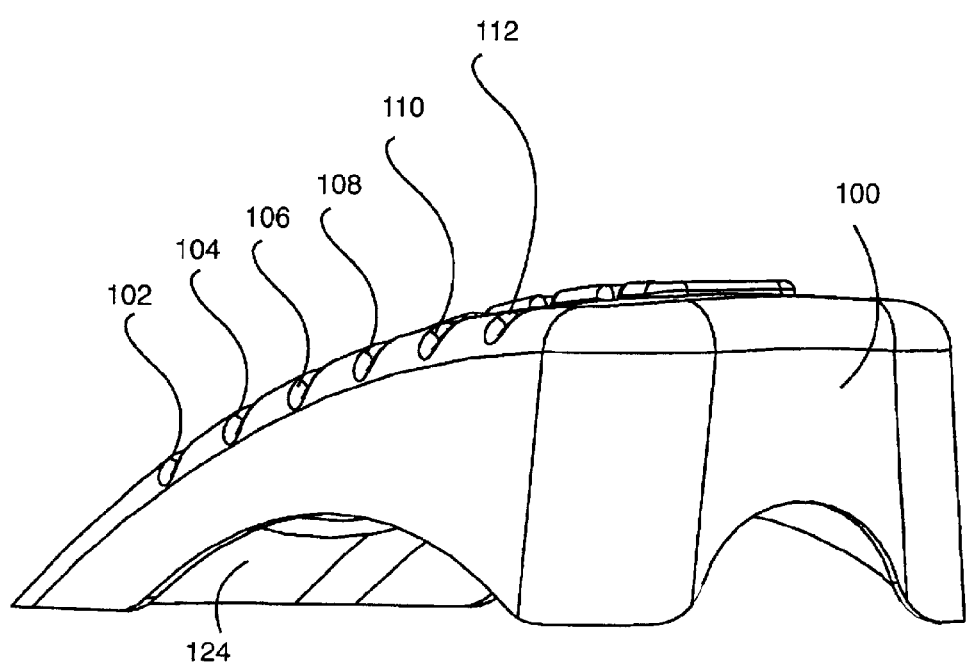
FIG. 10 comprises a rear view of the open-faced housing in accordance with one embodiment of the invention.
Figure 11:
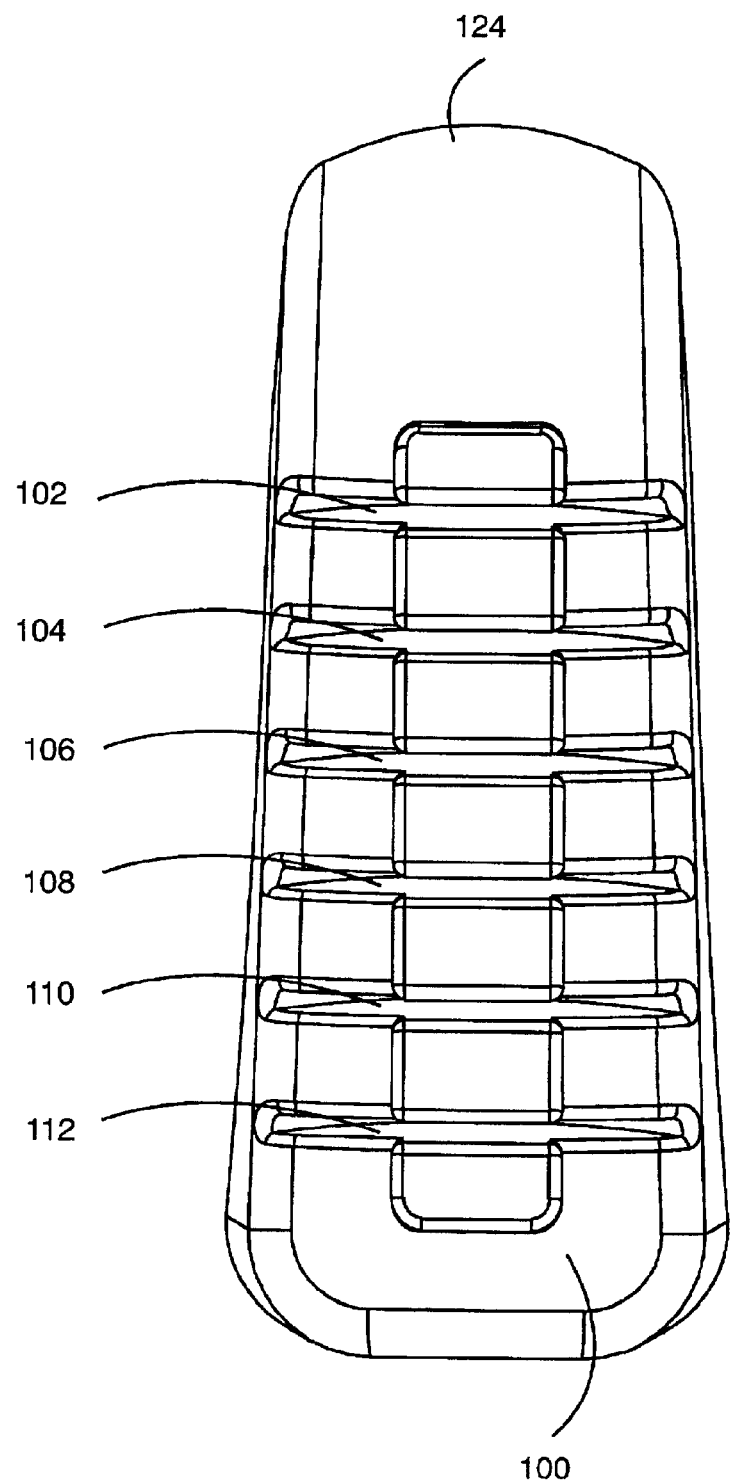
FIG. 11 comprises a top view of the open-faced housing with focus on a front portion and set of removable inserts in accordance with an embodiment of the invention.
Figure 12:
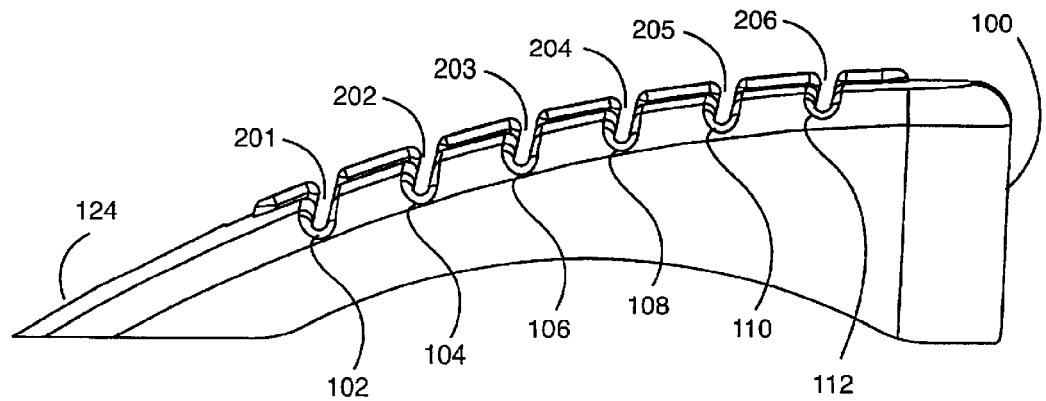
FIG. 12 comprises an example of a side view of the open-faced housing showing recessed grooves for disk storage in accordance with an embodiment of the invention.
Figure 13:
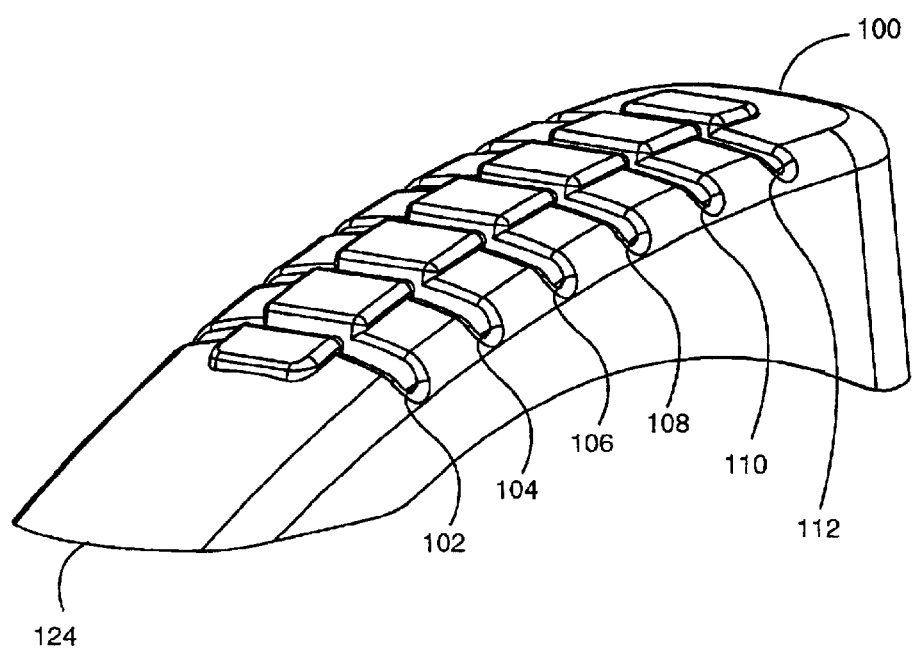
FIG. 13 comprises an example of an angled view of the front and top of the media storage device in accordance with one embodiment of the invention.
Figure 14:
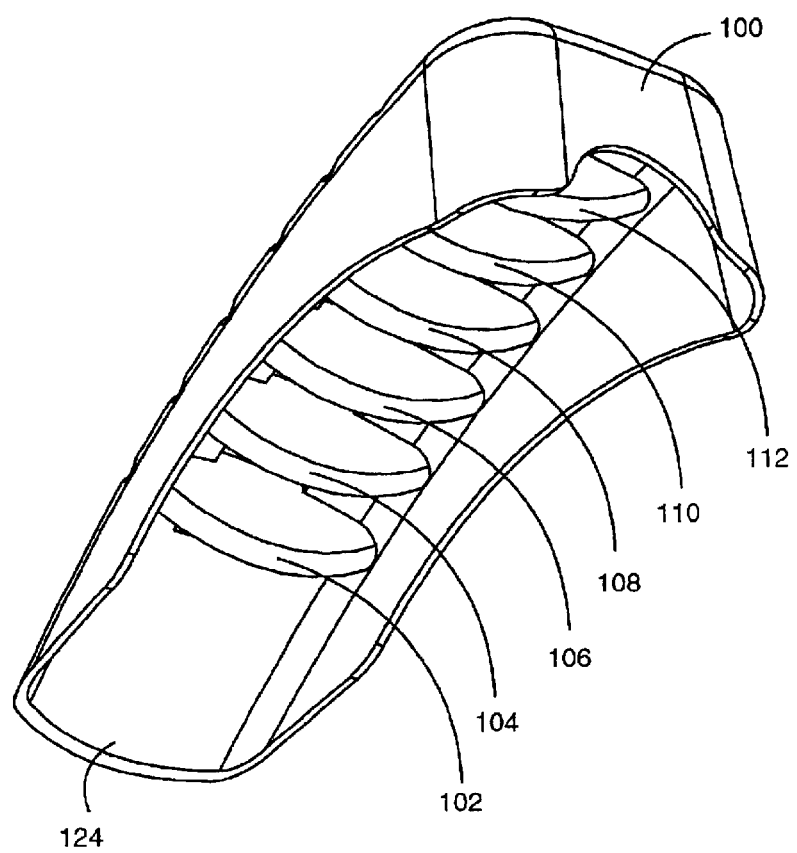
FIG. 14 comprises an example of an angled view of the bottom of the open-faced housing showing recessed central portion in accordance with an embodiment of the invention.

FIGS. 8 and 9 illustrate a top view and back view in accordance with one embodiment of the invention. FIG. 10 comprises a rear view of the open-faced housing in accordance with one embodiment of the invention. In the embodiment illustrated open-faced housing 100 comprises grooves 102–112 and lacks center portion 150 (see e.g., FIG. 14). Thus, FIG. 10 illustrates that center portion 150 is not required for purposes of holding disks. Grooves 102–112 may be recessed directly into open-faced housing 100, such that center portion 150 is optional. For instance, referring now to FIG. 11 that illustrates a top view with focus on a front portion and set of removable inserts in accordance with an embodiment of the invention, center portion 150 is shown in a manner that is integrated uniformly into housing 100. Thus, housing 100 is a single piece in one embodiment of the invention, but may also be separated into two or more pieces. FIG. 12 comprises an example of a side view of the open-faced housing configured as a single piece and showing recessed grooves for disk storage in accordance with an embodiment of the invention. Grooves 201–206 may optionally include a non-abrasive substances such a rubber or foam to hold disks into place. FIG. 13 comprises an example of an angled view of the front and top of the disk storage device in accordance with one embodiment of the invention. The device is configured as one piece in this embodiment illustrated in FIG. 13. FIG. 14 comprises an example of an angled view of the bottom of the open-faced housing showing recessed central portion in accordance with an embodiment of the invention. The bottom portion of grooves 102–112 are recessed into housing 100 such that the grooves become part of the housing. Thus, grooves become part of a recessed central portion couple to or part of housing 100.

The means and method for storing disks should be apparent to those skilled in the art after reading this disclosure. It should be understood that the foregoing is illustrative and not limiting and that obvious modifications may be made by those skilled in the art without departing from the spirit of the invention. Accordingly, reference should be made primarily to the accompanying claims and the full scope of their equivalents, rather than the foregoing specification, to determine the scope of the invention. Thus an apparatus for storing disks and a method relating thereto has been described.

What is claimed is:

1. An apparatus for holding disks comprising:
   an open-faced housing comprising a first groove and a second groove recessed into said open-faced housing wherein said open-faced housing provides users with a repository for holding a disk comprising digital media;
   said first groove and said second groove each comprising substantially parallel walls without inserts configured to engage and support non-computer readable data top portion of said disk and computer readable data section of bottom portion of said disk, wherein a user may place said disk in said first groove and said second groove without a case.

2. The apparatus of claim 1 wherein said first groove comprises a first bottom portion positioned below a second bottom portion associated with said second groove.

3. The apparatus of claim 2 further wherein said open-faced housing holds said first groove and said second groove at an incline so that said first bottom portion of said first groove is on a lower plane than said second bottom portion of said second groove.

4. The apparatus of claim 1 wherein said substantially parallel walls are separated by a space larger than the width of said disk.

5. An apparatus for housing disks comprising:
   an open-faced housing; said open-faced housing comprising a plurality of grooves recessed into a first portion of said housing; each of said plurality of grooves configured without inserts to engage and support non-computer readable data top portion of a disk and computer readable data section of bottom portion of said disk when a user places said disk into one of said plurality of grooves.

6. The apparatus of claim 5 further comprising: a base portion configured to position said housing at an incline so that each successive one of said plurality of grooves is positioned at a higher plane.

7. The apparatus of claim 6 wherein said incline positions said open-faced housing so that a back end of said open-faced housing is elevated higher than a front end of said open-faced housing.

8. The apparatus of claim 5 wherein said open-faced housing comprises a single continuous portion.

9. The apparatus of claim 8 wherein said single continuous portion is formed by injection molding.

10. An apparatus for holding disks comprising:
    a housing comprising a first recessed groove comprising a first bottom portion and first set of substantially parallel walls without inserts and a second recessed groove comprising a second bottom portion and second set of substantially parallel walls without inserts, wherein said first bottom portion is positioned below said second bottom portion;
    said first recessed groove configured to engage and non-computer readable data top portion of a first disk and computer readable data section of bottom portion of said first disk, wherein a user may place said first disk in said first recessed groove without a jewel case;
    said second recessed groove configured to support non-computer readable data top portion of a second disk and computer readable data section of bottom portion of said second disk, wherein a user may place said second disk in said second recessed groove without a second jewel case.

11. The apparatus of claim 10 wherein said housing is positioned at an incline so that each successive one of a plurality of recessed grooves is on higher plane than a preceding groove.

12. The apparatus of claim 10 further comprising: a stand configured to place said housing at said incline.

13. The apparatus of claim 10 wherein said plurality of recessed grooves have a depth such that a first groove of said plurality is higher than a second groove of said plurality.

14. The apparatus of claim 10 wherein said housing comprises a single continuous portion.

15. The apparatus of claim 14 wherein said single continuous portion is formed by injection molding.

16. An apparatus for holding disks comprising: an open faced housing comprising a plurality of grooves where each of said plurality of grooves are configured without inserts to engage and support non-computer readable data top portion of a disk and computer readable data section of bottom portion of said disk.

17. An apparatus for holding disks comprising: a housing comprising a plurality of grooves each of which are configured without inserts to engage and support non-computer readable data top section of a disk and computer readable data section of bottom portion of said disk, each said groove of which is arranged at an incline such that each successive one of said plurality of grooves is positioned on a plane higher than a preceding groove.

* * * * *